United States Patent
Richter

(10) Patent No.: US 11,908,677 B1
(45) Date of Patent: Feb. 20, 2024

(54) GASEOUS TRITIUM LIGHT SOURCE

(71) Applicant: mb-microtec ag, Niederwangen bei Bern (CH)

(72) Inventor: Karsten Richter, Bern (CH)

(73) Assignee: mb-microtec ag, Niederwangen bei Bern (CH)

(*) Notice: Subject to any disclaimer, the term of this patent is extended or adjusted under 35 U.S.C. 154(b) by 0 days.

(21) Appl. No.: 18/046,260

(22) Filed: Oct. 13, 2022

(51) Int. Cl.
| | |
|---|---|
| H01J 65/06 | (2006.01) |
| C09K 11/56 | (2006.01) |
| H01J 61/12 | (2006.01) |
| F41G 1/34 | (2006.01) |
| H01J 61/35 | (2006.01) |
| H01J 61/02 | (2006.01) |
| G04B 19/32 | (2006.01) |
| H01J 61/30 | (2006.01) |

(52) U.S. Cl.
CPC ............ *H01J 65/06* (2013.01); *C09K 11/565* (2013.01); *F41G 1/345* (2013.01); *G04B 19/32* (2013.01); *H01J 61/025* (2013.01); *H01J 61/12* (2013.01); *H01J 61/305* (2013.01); *H01J 61/35* (2013.01)

(58) Field of Classification Search
CPC .................................. F41G 1/345; H01J 65/06
USPC .............................................................. 313/54
See application file for complete search history.

(56) References Cited

U.S. PATENT DOCUMENTS

| | | | |
|---|---|---|---|
| 6,310,737 B1 * | 10/2001 | Gillich | G02B 1/14 |
| | | | 359/884 |
| 2011/0107650 A1 | 5/2011 | Howe et al. | |
| 2011/0249428 A1* | 10/2011 | Profos | F41G 1/32 |
| | | | 362/159 |
| 2017/0321992 A1* | 11/2017 | Erdle | F41G 1/02 |
| 2018/0010886 A1* | 1/2018 | Kind | H01J 61/35 |
| 2018/0053575 A1* | 2/2018 | Karchon | G21F 5/015 |
| 2018/0231350 A1 | 8/2018 | Howe et al. | |
| 2022/0178650 A1 | 6/2022 | Smith et al. | |
| 2022/0178651 A1 | 6/2022 | Wyka | |

FOREIGN PATENT DOCUMENTS

| | | |
|---|---|---|
| WO | 2016124686 A1 | 8/2016 |
| WO | 2019209535 A1 | 10/2019 |

* cited by examiner

*Primary Examiner* — Christopher M Raabe

(57) ABSTRACT

A gaseous tritium light source (GTLS), which has a hermetically sealed outer sleeve made of glass, more particularly borosilicate glass. A high durability and lighting intensity is produced due to the fact that at least some sections of the outer sleeve have an outer coating applied directly to the outer surface of the outer sleeve serving as a reflective layer made of a metal, wherein the outer coating has an epitaxial structure and wherein the metal has a reflectance of >70% for visible light.

20 Claims, 2 Drawing Sheets

GASEOUS TRITIUM LIGHT SOURCE

FIELD OF THE INVENTION

The invention relates to a gaseous tritium light source (GTLS) with a hermetically sealed outer sleeve made of glass.

BACKGROUND OF THE INVENTION

Gaseous tritium light sources (GTLS) with a hermetically sealed outer sleeve for example made of borosilicate glass are known from the prior art, which are coated on the inside with a luminophore, for example phosphorus, zinc sulfide, etc., and filled with tritium. To increase handling safety, gaseous tritium light sources are embedded in a plastic casing that has titanium-based particles added to it, for example $TiO_2$, as a reflector that increases the luminance of the gaseous tritium light source at night. Measurements have shown, however, that such reflective envelopes produce an improvement of visibility at night. For a better visibility at night the improvement shall be increased further.

The object of the invention, therefore, is to optimize the luminance of a gaseous tritium light source of the type described at the beginning.

SUMMARY OF THE INVENTION

If at least some sections of the outer sleeve have an outer coating applied directly to the outer surface of the outer sleeve serving as a reflective layer made of a metal, wherein the outer coating has an epitaxial structure and wherein the metal has a reflectance of >70% for visible light, then it is possible as a result to significantly increase the emitted luminance of the gaseous tritium light source.

Surprisingly, this increase in the luminance of the gaseous tritium light source goes beyond a degree of an increased reflectance in comparison to known gaseous tritium light sources. The epitaxial structure of the outer coating thus appears to promote an improved excitation of the inner coating of the outer sleeve, causing the luminance of the gaseous tritium light source to increase beyond the expected degree. It is thus possible according to the invention to produce a gaseous tritium light source with a luminance L that is increased to a surprising degree (as is known, the luminance relates to the visible light emitted).

In order to increase the luminance of the gaseous tritium light source to a particularly high degree, the reflectance of the metal is preferably >80% for visible light with a wavelength in the range from 400 to 730 nm, more particularly from 430 to 680 nm.

If the metallic outer coating contains aluminum (Al) or silver (Ag), then it is possible to use an inexpensive coating and a material with a high reflectance for visible light on the outer sleeve. These advantages are particularly relevant if the metallic outer coating consists of aluminum (Al) or silver (Ag). In addition, aluminum (Al) or silver (Ag) is suitable as a metallic outer coating particularly for an outer sleeve made of borosilicate glass.

For example, if the metallic outer coating is embodied as a thin film, then this can lead to an almost complete prevention of transmission and can thus further improve the reflection. Such a thin film can be produced on the outer sleeve by means of a PVD method, for example. It is thus possible, among other things, to obtain a high-quality, extremely thin, economical, and favorably adhering coating on the outer sleeve.

Preferably, the layer thickness of the outer coating is in the range from 30 to 500 nm, for example from 50 to 200 nm. Such layer thicknesses allow the luminance to be increased by many times over.

The metallic outer coating can be completely covered by a protective coating. It is thus possible to prevent an unwanted oxidation of the outer coating or damage to it. This also makes it possible to produce a chemically rugged coating of the outer sleeve, which further increases the durability of the gaseous tritium light source.

For example, the protective coating can consist of a ceramic coating or a metallic coating.

A ceramic coating in the form of a $SiO_2$ layer or $Al_2O_3$ layer can be provided.

An alternative coating to this can be a Ni layer, Cr layer, or Ni—Cr layer, in order, for example, to further reduce the production costs of the gaseous tritium light source.

If the outer sleeve has a circumference surface and the outer coating is provided on this circumference surface, then it is possible to further increase the luminance. This is particularly the case if the reflective layer is provided over the entire area of the circumference surface.

A further increase in the luminance can be achieved if the outer sleeve has a first end on which the outer coating is provided. This is particularly the case if the reflective layer is provided over the entire area of the first end.

Preferably, the outer sleeve has a second end that is not covered by the outer coating. It is thus possible to achieve a gaseous tritium light source that produces particularly bright light at this location.

Preferably, the average luminance (L) is >1.7 [$cd/m^2$ or candela per square meter], more particularly 2.0 [$cd/m^2$], which particularly distinguishes the invention in comparison to other gaseous tritium light sources and the use thereof.

The foregoing is particularly true, for example, when the size of the gaseous tritium light source is taken into account.

The outer sleeve of the gaseous tritium light source can have a diameter of 2 mm (millimeter). Preferably, the diameter is in the range from 0.9 to 1.6 mm.

Alternatively, or in combination with this, the outer sleeve of the gaseous tritium light source can have a length of 10 mm. Preferably, the outer sleeve has a cylindrical shape. Preferably, the length is in the range from 3 to 8 mm.

The gaseous tritium light source according to the invention can be particularly suitable for an insert that has a plastic housing, with the plastic housing at least partially enclosing the gaseous tritium light source. In this case, it can turn out to be advantageous if the plastic housing consists of transparent plastic.

This insert can be used, for example, in a sight. The sight can be used, for example, on a firearm.

It is also conceivable for the gaseous tritium light source or insert according to the invention to be used in a timepiece.

BRIEF DESCRIPTION OF THE DRAWINGS

The subject matter of the invention is shown in greater detail by way of example in the figures based on an embodiment variant. In the drawings.

DETAILED DESCRIPTION OF THE PREFERRED EMBODIMENTS

Figure 1:
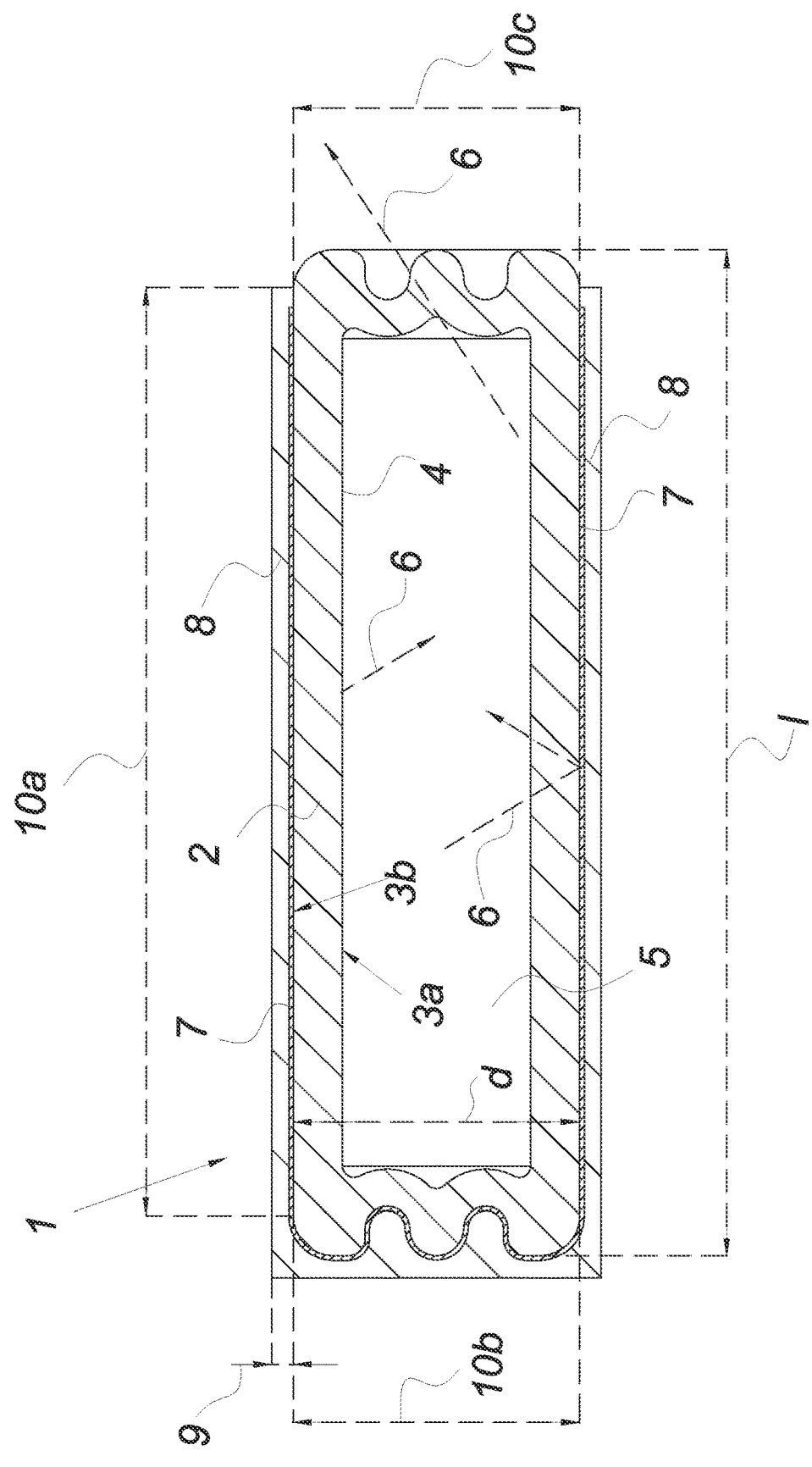
FIG. 1 shows a cross-sectional view through a gaseous tritium light source.

FIG. 1 shows a gaseous tritium light source (GTLS) 1 with a hermetically sealed outer sleeve 2 made of glass, namely borosilicate glass. The essentially cylindrical outer sleeve 2 has for example an inner diameter d of 1.2 mm (millimeters) and a length l of 6 mm.

An inner coating 4 with a luminophore such as zinc sulfide is provided on the inside 3a of the outer sleeve 2. The outer sleeve 2 is filled with gaseous tritium 5, whose emitted radioactive radiation excites the zinc sulfide to emit visible light 6. This visible light is essentially emitted via the entire outer sleeve 2.

To increase the luminance of the emitted visible light 6, the invention proposes for the outer surface 3b of the outer sleeve 2 to have an outer coating 7 made of a metal. This outer coating 7 is applied directly to the outer surface 3b and is provided in some areas thereof. In addition, this outer coating 7 has an epitaxial structure. Furthermore, the reflectance of the metal of the outer coating 7 is >70% for visible light. This increases the luminance L of the gaseous tritium light source (GTLS) in comparison to known gaseous tritium light sources in a surprising way—as is clear from Table 1.

TABLE 1

Measurement results GTLS 1 to GTLS 6

| Examples | Outer sleeve | Luminance at 530 nm [cd/m$^2$] | Relative luminance [%] |
|---|---|---|---|
| GTLS1 | Blank | 1 | 100 |
| GTLS2 | Plastic housing (white) | 1.5 | 150 |
| GTLS3 | Applied adhesive with TiO$_2$ particles | 1.55 | 155 |
| GTLS4 | Al housing | 1.2 | 120 |
| GTLS5 | Al thin film | 2.0 | 200 |
| GTLS6 | Al thin film and SiO$_2$ protective coating | 2.2 | 220 |

Example GTLS1 shows the prior art of gaseous tritium light sources with a blank outer sleeve made of borosilicate glass. Examples GTLS2 to GTLS4 show known uses of example GTLS1. In example GTLS2, a GTLS1 of this kind with a blank outer sleeve is enclosed in a white plastic housing. GTLS3 shows a GTLS1 with an adhesive containing TiO$_2$ particles applied to the outer sleeve. GTLS4 encloses the GTLS1 (blank outer sleeve) with an Al housing—specifically, the gaseous tritium light source is inserted without adhesive into a blind bore in the aluminum housing.

Examples GTLS5 and GTLS6 are embodiments according to the invention in which the outer sleeve 7 has an Al thin film (GTLS5) or an Al thin film and an Al$_2$O$_3$ protective coating 8 embodied as a thin film (GTLS6).

In GTLS2 to GTLS6, the outer sleeve is uncovered or blank only at one end of the gaseous tritium light source. The luminance of the green light emitted by the gaseous tritium light sources (wavelength 530 nm) normal to these ends is measured with the PR-740 spectroradiometer made by Photo Research, Inc.

As a comparison of examples GTLS1 to GTLS4 with the examples GTLS5 and GTLS6 according to the invention demonstrates, a surprising improvement in the luminance—at the 530 nm (nanometer) wavelength of the emitted light 6—is apparent. In terms of the luminance, GTLS5 and GTLS6 even significantly outperform an outer sleeve of borosilicate glass onto which adhesive with TiO$_2$ particles is applied—which according to the current consensus among experts, should be the most effective measure for increasing luminance in GTLS.

The reflectance of the coating material Al is also >80%, namely 93%, for visible light with a wavelength in the range from 400 to 730 nm, namely of 530 nm—which increases the luminance to 2 [cd/m$^2$] or doubles it in comparison to the GTLS1 gaseous tritium light source.

For this purpose, Al is applied as a thin film to the outer surface 3b the outer sleeve 2 by means of a PVD method. This makes it possible to achieve an outer coating 7 with an average layer thickness of 100 nm—i.e. within the range from 30 to 500 nm.

The outer coating 7 is protected from mechanical and chemical attacks by an Al$_2$O$_3$ protective coating 8, which is likewise applied as a thin film by means of a PVD method. This provides the outer sleeve 2 with a thin film composite 9 made of two thin films, which adheres in a particularly powerful way to the outer sleeve 2 made of borosilicate glass. This further increases the durability of the gaseous tritium light source 1.

Figure 2:
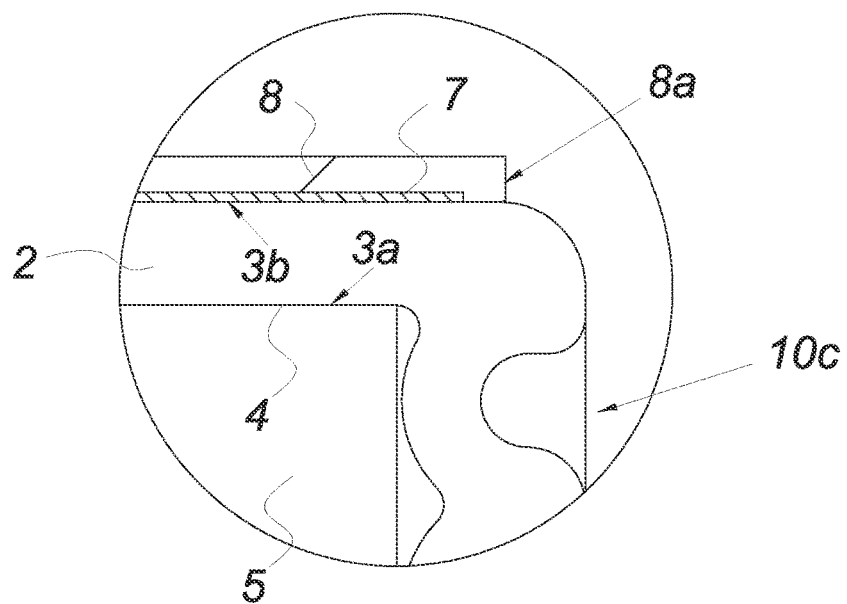
FIG. 2 shows a detail view from FIG. 1.

Preferably, the protective coating 8 completely covers the outer coating 7, as is clear from FIGS. 1 and 2. This is shown, for example, in FIG. 2, where the layer end 8a of the protective coating 8 encloses the end of the outer coating 7.

It is also clear from Table 1 that surprisingly, a further increase in the luminance of GTLS6 to 2.2 [cd/m$^2$] can be achieved—namely by 10% in comparison to GTLS5 according to the invention.

As can be inferred from FIG. 1, the outer sleeve 2 has a circumference surface 10a, which is provided with the outer coating 7 over its entire area. The outer coating 7 also covers the entire area of a first end 10b— as shown in FIG. 1. Only the second end 10c is not covered by the outer coating 7. The gaseous tritium light source 1 therefore has a particularly high luminance at this second end 10c.

Figure 3:
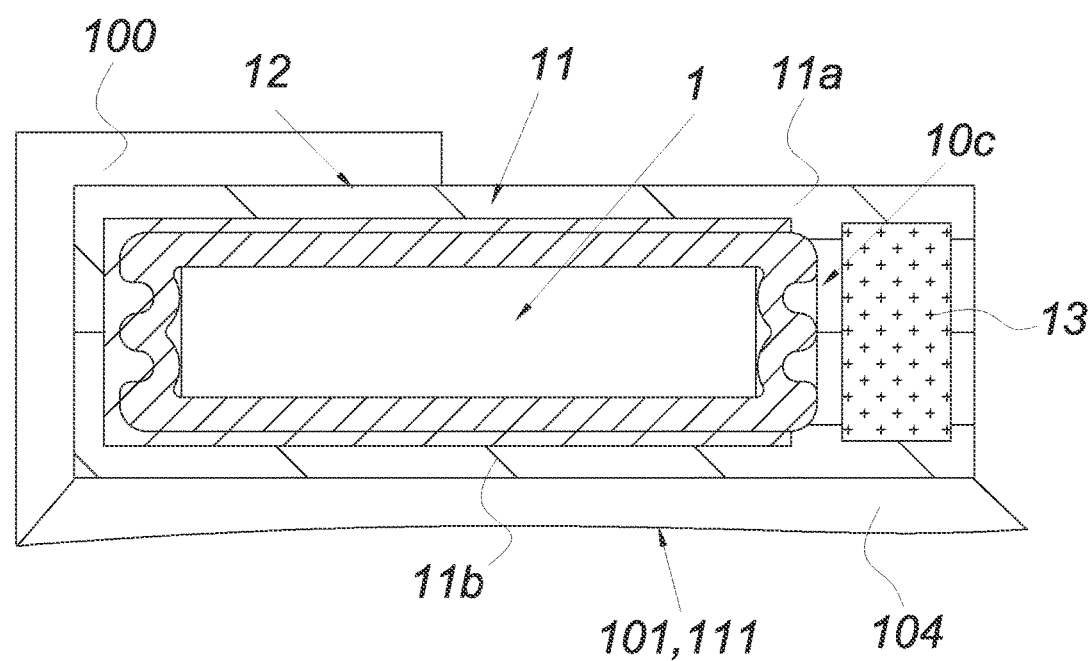
FIG. 3 shows an insert with the gaseous tritium light source according to FIG. 1.

To protect the gaseous tritium light source 1, it is embedded in a plastic housing 11, as shown in FIG. 3. It is thus possible for the gaseous tritium light source 1 to be used in the form of an insert 12, for example in a sight 100 on a barrel 104 of a firearm 101 or for example in a timepiece 111—not shown. For example, the insert 12 is glued to the sight 100 by means of an adhesive that is not shown.

The outer coating 7 eliminates the need for a reflective effect of a plastic housing 11 that is required in the prior art so that this housing can also be embodied as transparent and/or as consisting of two shells 11a, 11b. This is advantageous particularly if an optical lens 13 is likewise inserted into the plastic housing 11 and thus significantly simplifies the design of such an insert 12.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

The invention claimed is:

1. A gaseous tritium light source (GTLS), comprising:
   a hermetically sealed outer sleeve made of glass, coated on an inner surface with a luminophore, and filled with gaseous tritium, wherein at least some sections of the outer sleeve have an outer coating applied directly to an outer surface of the outer sleeve, the outer sleeve having a circumference surface with the outer coating provided on the circumference surface and with the outer coating serving as a reflective layer made of a metal, wherein the metal has a reflectance of >70% for visible light, wherein the metallic outer coating is a thin film having a thickness in a range from 30 to 500 nm and wherein the gaseous tritium light source has an average luminance (L)>1.7 [cd/m$^2$].

2. The gaseous tritium light source according to claim 1, wherein the reflectance of the metal is >80% for visible light with a wavelength in a range from 400 to 730 nm.

3. The gaseous tritium light source according to claim 1, wherein the metallic outer coating contains aluminum (Al) or silver (Ag).

4. The gaseous tritium light source according to claim 1, wherein the metallic outer coating consists of aluminum (Al) or silver (Ag).

5. The gaseous tritium light source according to claim 1, wherein the metallic outer coating is completely covered by a protective coating.

6. The gaseous tritium light source according to claim 5, wherein the protective coating consists of a ceramic coating or a metallic coating.

7. The gaseous tritium light source according to claim 5, wherein the protective coating consists of one of the group consisting of: a SiO$_2$ layer, an Al$_2$O$_3$ layer, a Ni layer, a Cr layer, and a Ni—Cr layer.

8. The gaseous tritium light source according to claim 1, wherein the outer sleeve has a first end on which the outer coating is provided.

9. The gaseous tritium light source according to claim 8, wherein the outer sleeve has a second end that is not covered by the outer coating.

10. The gaseous tritium light source according to claim 1, wherein the outer sleeve has a circumference surface and the outer coating is provided over an entire area of the circumference surface.

11. The gaseous tritium light source according to claim 1, wherein the outer sleeve has a first end, and the outer coating is provided over an entire area of the first end.

12. The gaseous tritium light source according to claim 1, wherein the outer sleeve of the gaseous tritium light source has a diameter of ≤2 mm, and/or a length of 10 mm.

13. A timepiece comprising the gaseous tritium light source according to claim 1.

14. An insert, comprising:
the gaseous tritium light source according to claim 1; and
a plastic housing that at least partially encloses the gaseous tritium light source.

15. A sight comprising the insert according to claim 14.

16. A firearm comprising the sight according to claim 15.

17. A firearm comprising the insert according to claim 14.

18. The insert according to claim 14, wherein the plastic housing is made of transparent plastic.

19. The gaseous tritium light source according to claim 1, wherein the outer coating has an epitaxial structure.

20. The gaseous tritium light source according to claim 5, wherein the protective coating consists of one of the group consisting of: a Ni layer, a Cr layer, and a Ni—Cr layer.

* * * * *

UNITED STATES PATENT AND TRADEMARK OFFICE
CERTIFICATE OF CORRECTION

PATENT NO. : 11,908,677 B1
APPLICATION NO. : 18/046260
DATED : February 20, 2024
INVENTOR(S) : Karsten Richter Page 1 of 1

It is certified that error appears in the above-identified patent and that said Letters Patent is hereby corrected as shown below:

In the Specification

Column 2, Line 31: please delete "2.0 [cd/m$^2$]" and insert -- $\geq 2.0$ [cd/m$^2$] --,
Column 2, Line 36: please delete "of 2 mm" and insert -- of $\leq 2$ mm --,
Column 2, Line 39: please delete "of 10 mm" and insert -- of $\leq 10$ mm --,
Column 3, Line 3: please delete "length 1" and insert -- length l --, In the Claims Column 6, Line 13: please delete "a length of 10 mm" and insert -- a length of $\leq 10$ mm --.

Signed and Sealed this
Thirteenth Day of May, 2025

Coke Morgan Stewart
*Acting Director of the United States Patent and Trademark Office*